Sept. 29, 1959

E. C. PETERSON 2,906,294

DUCT STRUCTURE FOR PIPES

Filed Nov. 27, 1953

INVENTOR
EARL C. PETERSON
BY
Williamson, Williamson, Schroeder & Adams
ATTORNEYS Sept. 29, 1959    E. C. PETERSON    2,906,294
DUCT STRUCTURE FOR PIPES
Filed Nov. 27, 1953    2 Sheets-Sheet 2
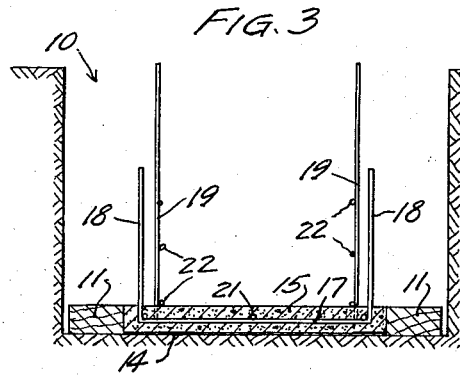
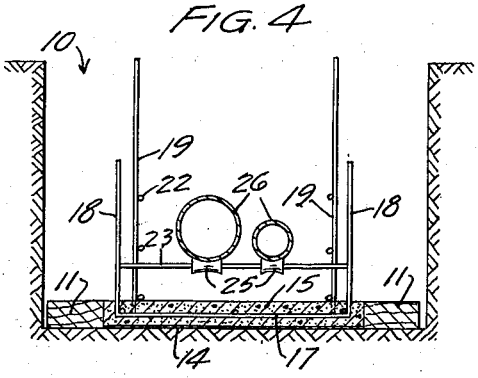
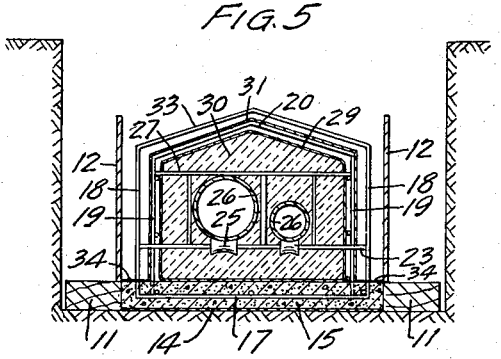
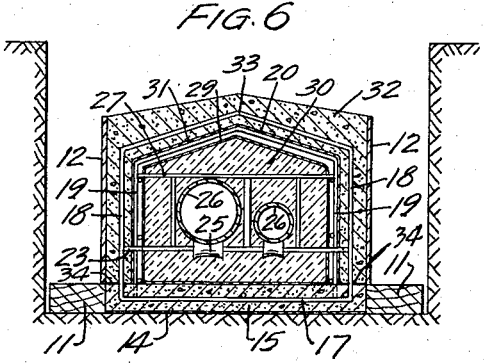
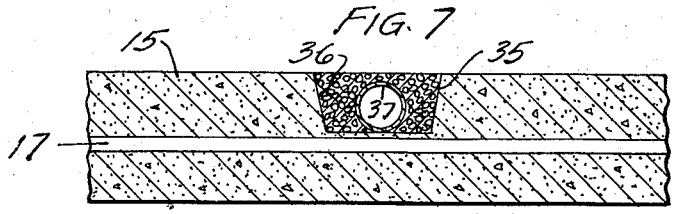
INVENTOR
EARL C. PETERSON
BY
Williamson, Williamson, Schroeder & Adams
ATTORNEYS

United States Patent Office 2,906,294
Patented Sept. 29, 1959

2,906,294

DUCT STRUCTURE FOR PIPES

Earl C. Peterson, Minneapolis, Minn.

Application November 27, 1953, Serial No. 394,811

8 Claims. (Cl. 138—48)

This invention relates to a monolithic duct structure for pipes adapted to carry fluids at a temperature such as to warrant insulation, and to a method of fabricating the duct structure.

Numerous prior art structures have been proposed wherein lengths of pipe are laid in suspended relation with the surrounding soil to provide for expansion and contraction of the pipe and further to provide heat insulation around the pipe while preventing moisture from seeping therein. The difficulty with the prior art structures lies in building an adequate protection for the fluid carrying pipes which will be inexpensive, permanent and at the same time easy to repair should a break occur either in the structure or in the pipe itself.

Some of these prior art devices propose suspension structures such as hangers and rollers and, furthermore, require laborious and expensive preparation where the structure is monolithic. Since pre-cast conduit pieces result in frequent joints which are difficult to maintain in water-tight relation, this invention is concerned only with the monolithic type where substantial lengths of the duct structure, for example 100 feet or more, are cast in a single unit.

To the best of my knowledge no prior art method has evolved whereby a portion of the duct structure can be first formed with lengths of pipe laid in situ within the partially formed structure and welded or joined while lying in the same final supported position, and then finished by pouring the upper and side walls in a long and continuous, monolithic concrete duct having no more space surrounding the pipe than necessary. The present invention contemplates such procedure resulting in high efficiency and economy as compared to prior art structures and methods.

It is therefore an important object of the invention to provide an inexpensive and highly efficient duct structure, and method of fabrication thereof, in which a single structure houses fluid-carrying pipes neatly in insulated and protected condition.

It is another object of the invention to provide a monolithic duct structure of the class described in which a preformed framework constitutes a reinforcing structure for the monolithic concrete archway and also provides support means for suspending the pipe in medial insulated position, allowing for contraction and expansion.

It is another object of the invention to provide a duct structure wherein the framework underlies and supports an inner permanent form, thereby eliminating the necessity for more than an outer side form structure during pouring of the concrete archway.

It is another object of the invention to provide a structure of the class described in which drainage of fluid accidently present within the duct is easily accomplished, and wherein the duct structure may be repaired at local points with a minimum of damage to the remainder of the structure.

It is a still further object of the invention to provide a novel method of constructing monolithic pipe ducts in which the pipe may be welded in long sections in situ as an intermediate step in the construction of the entire duct structure.

These and other objects and advantages of my invention will more fully appear from the following d_scription made in connection with the accompanying drawings wherein like reference characters refer to similar parts throughout the several views and in which:

Fig. 3 is a vertical section of the base structure showing the upstanding supporting and reinforcing frame members in secured position with relation to the concrete base slab;

Fig. 4 is a similar vertical section to that shown in Fig. 3, the suspension member having been added and pipes positioned thereupon;

Fig. 5 is another vertical section showing the additional steps of adding the water barrier sheet material, the upper rod connections, insulating material, form material, and the outer temporary concrete form;

Fig. 6 is a similar vertical section to that shown in Figs. 3–5 showing the appearance of the duct after the final step of pouring the concrete monolithic archway; and Fig. 7 is a detailed enlarged segment of the concrete base slab at a central portion, an alternate bottom trough structure having been formed therewith to provide drainage for fluid which may accidently be present within the duct.

Figure 1:
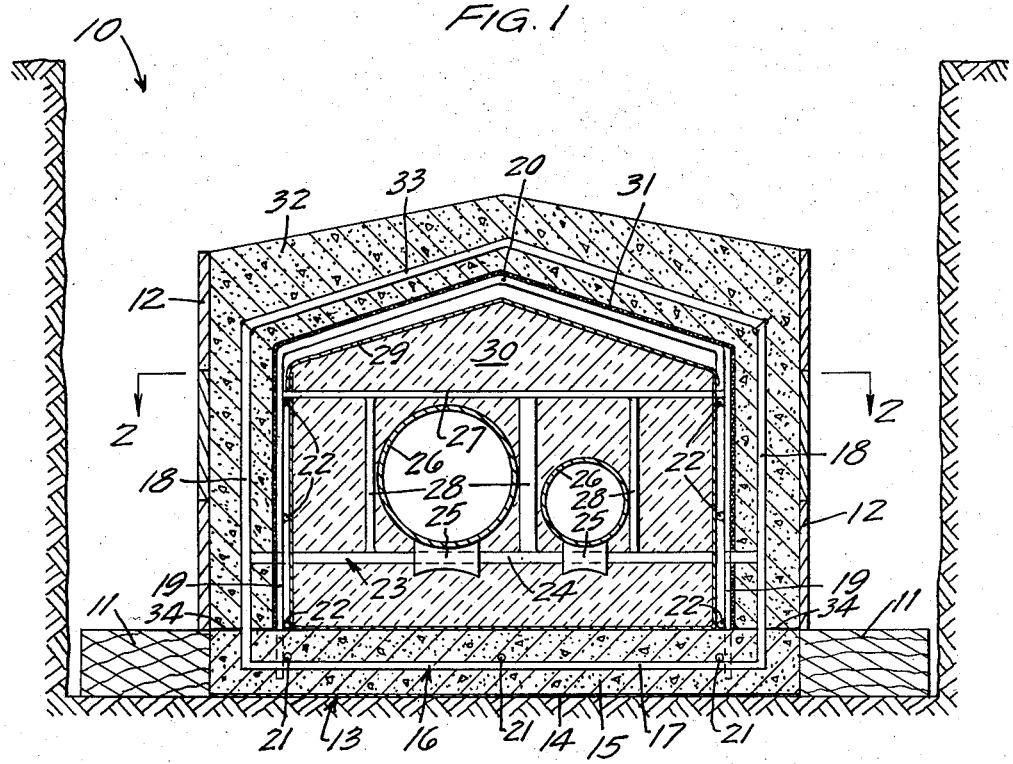
Fig. 1 is a vertical cross section of my duct structure in completed form with the excavation and forms still in position.
Figure 2:
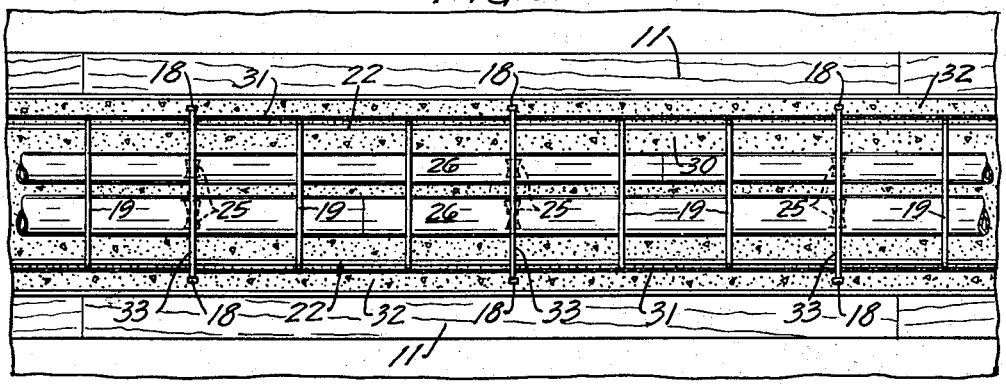
Fig. 2 is a horizontal sectional view of a portion of the monolithic length of duct taken on the line 2—2 of Fig. 1 and somewhat reduced in size.

Referring now more particularly to the drawings, the duct structure is shown in detail in Figs. 1 and 2. Although my invention may be applicable to above ground structures or may be combined partially within the earth and partially above it, it is primarily intended to be used in the conventional underground manner. The duct therefor is shown lying within a trench-type excavation 10 formed in the surface of the ground as shown. Because of the economical procedure involved, as will be hereinafter set forth, my structure may involve an excavated trench of considerably smaller dimensions and the duct itself may be considerably smaller than those required by prior art procedures for the same size pipes. At the bottom of the trench 10 is an outer form consisting of a pair of longitudinal timbers 11 which may be laid at each side of trench 10 in spaced parallel relation, the timbers at each side abutting in end-to-end relation with the next aligned and longitudinal timber. Outer form boards 12 are secured in the position shown in Fig. 1 by means (not shown) so as to constitute the outer concrete form in conjunction with timbers 11.

A base structure shown generally at 13 comprises a sheet of water barrier material 14 which underlies the duct structure and is positioned between the spaced, parallel timbers 11. A concrete base slab 15 is poured between the timbers 11, upstanding supporting and reinforcing frame members 16 having first been positioned so as to be set firmly in the concrete base. The upstanding supporting and reinforcing frame members may constitute heavy reinforcing bars bent in a general U shape so as to provide an embedded horizontal portion 17 and two spaced upright side members 18, the upper ends of which extend upwardly from the concrete base slab 15. Form supporting rods 19 likewise are positioned with their lower ends within the concrete slab 15 and extend upwardly in bent relation to meet at an upper apex as shown. The reinforcing structure may further have longitudinal and horizontal rods 21 embedded in the concrete slab 15 and 22 welded to the upright rods 19 for additional strength in the frame structure.

A plurality of suspension members indicated generally at 23 are rigidly secured across the supporting and reinforcing frame structure and may constitute a shaft 24 secured as by welding across the frame structure to the upright rods 18 as shown. Rollers 25 may be rotatably positioned on shaft 24 for holding one or more pipes 26 for carrying fluids at either an elevated or depressed temperature and allowing the pipes 26 to expand or contract at will without undue stress in the pipes themselves or in the outer duct structure. The suspension member is not new in and of itself, and it is contemplated that a number of types of suspension members may be usefully employed in practicing this invention provided the suspension member can be rigidly tied in with the frame structure at a period intermediate the construction steps. Additional bracing members such as the rods 27 may be horizontally secured across the supporting frame structure and vertical strut rods 28 may be interposed between the horizontal rods 27 and corresponding shaft members 24.

Water barrier sheet material 29 lies inwardly of the supporting frame structure and preferably in contact with the horizontal reinforcing members 22 and the upper surface of slab 15. Insulating material 30 surrounds the pipes 26 and fills the space between the barrier sheet 29 and the pipes themselves.

The upper ends of the reinforcing rods 19 form an archway and are secured together at the apex 20 as previously noted. These rods 19 form a support for the inner form material which preferably comprises metal mesh 31. The metal mesh 31 is tied to the outside plane formed by the plurality of upright rods 19 and constitutes a pouring form together with the outer temporary form boards 12 into which the monolithic arched concrete slab 32 may be poured. The upper ends of the upstanding reinforcing rod 18 may be further secured by extending thereacross in welded relation with the rods 33 before the monolithic archway 32 is poured.

The procedure by which the duct structure is fabricated is illustrated in Figs. 3–6. The excavated trench 10 is supplied with longitudinal spaced timbers 11, the spacing therebetween being measured throughout the entire length of the duct. The supporting and reinforcing frame members are then tied together between the timbers 11 and in spaced relation with the bottom of trench 10. The U-shaped reinforcing rods 16 have side members 18 which extend upwardly as shown in Figs. 3 and 4. The inner form supporting rods 19 likewise extend upwardly and terminate at a point considerably higher than the ends of rods 18. The horizontal reinforcing rods 21 and 22 may then be wired or welded to the spaced upstanding rod members following which the concrete base slab 15 is poured between the timbers 11. As previously noted a water barrier sheet 14 may be placed at the bottom of trench 10.

Now with the trench 10 still in open condition, the suspension members 23 are welded rigidly across the upstanding rods 18 and in spaced relation with the base slab 15 as shown in Fig. 4. Pipes 26 may then be lowered into the open trench 10 and laid upon respective rollers 25 with the ends of each length abutting an adjacent length as previously noted. The welding operator then may tack together the ends of abutting pipes so as to preliminarily fasten two adjacent pipes together. A second workman then slowly rotates the pipes as by means of a large pipe wrench while the welding operator completes the welding of the abutted pipes without changing the position of his welding equipment. A considerable number of pipe lengths can thus be welded in situ before it becomes necessary for the welding operator to make a "position" weld. The "position" weld requires the welding operator to move his torch all the way around the circumference of the pipe and is a laborious and costly procedure. Prior art methods require each of the junctures to be "position" welded or pre-welded before lowering into the trench.

After the pipes 26 have been welded along their entire length, additional reinforcing rods may be welded into the frame structure as typified by the horizontal rods 27 and strut rods 28. Water barrier sheet material 29 is then placed about the outer periphery of the space within the reinforcing framework, suitable openings and slits (not shown) being made to accommodate the cross bracing and suspension members where necessary. Noncapillary insulating material such as glass wool 30 is then packed between the pipes 26 and the water barrier sheeting 29 and the sheeting is then formed over the insulating material and pipes 26 as shown in Fig. 5. Rods 19 are bent over the pipes in arched relation and are secured together at the apex 20 as previously noted. Wire mesh 31 is then secured to the upstanding rod members 19 all the way from the base slab 15 at one side thereof, over the apex 20 and down the other side to meet slab 15 at the opposed side. Top reinforcing rods 33 which are bent to conform with the arched outline of the structure are then welded to the upper ends of the upstanding rods 18 to complete the reinforcing and supporting structure. Outer form boards 12 may then be constructed to provide the support for the sides of the concrete archway. A bonding layer 34 may be laid along the side edges of base slab 15 so as to surround the upstanding rods 18 and lie between the outer form 12 and the wire mesh 31.

The arched concrete monolithic structure is then poured for a length desired and the top is leveled to produce the desired arched conformation. Waterproofing coatings may be applied as desired to the outer surface of the arched slab after the concrete has set. The outer form, including both the boards 12 and the timbers 11, may then be removed for future use. The excavation is then refilled to complete the structure.

Referring now to Fig. 7, a drain trough 35 may be formed at the same time that the slab 15 is poured, a chamfered piece of lumber having been placed centrally and longitudinally of the upper surface of the base slab at the time the concrete was poured therein. The drain trough 35 is then left in open condition or may be filled with coarse and permeable material such as gravel 36. A perforated suction tube 37 may also be laid within the drain trough 35 and is especially useful where it is desired to pump any fluid accidently confined within the duct structure to a higher level. Periodic drain openings or other means for communicating with the drain trough 35 may be supplied as needed.

It thus may be seen that I have provided a novel underground duct structure and a method for fabricating duct structure which is highly efficient, both in the material and labor cost involved in building the duct and in the high quality of the finished structure. Because of the efficient procedure involved, the trench excavation and the duct structure itself may be compactly built without the waste of material and labor.

It will, of course, be understood that various changes may be made in the form, details, arrangement and proportions of the parts without departing from the scope of my invention.

What I claim is:

1. A duct structure for pipes adapted to carry fluids at a temperature such as to require insulation, said duct comprising a base structure having a concrete base slab at the bottom thereof and upstanding supporting and reinforcing frame members secured in transverse spaced relation therewith, a shaft and roller suspension horizontally and rigidly tied across said supporting and reinforcing frame members at a position medially of the top and bottom of said duct, an arched monolithic superstructure comprising a form support and a concrete archway in overlying supported relation with said form support and said base slab, and a length of pipe supported on said shaft and roller suspension for expansion and contraction thereon during use.

2. A duct structure for pipes adapted to carry fluids at a temperature such as to require insulation, said duct comprising a base structure having a concrete base slab at the bottom thereof and upstanding supporting and reinforcing frame members secured in transverse spaced relation therewith, a suspension member horizontally and rigidly tied across said spaced supporting and reinforcing frame members and at a position medially of the top and bottom of said duct, an arched monolithic superstructure comprising a form support, overlying wire mesh form material and a concrete archway in overlying supported relation with said wire mesh form and in contact with said slab at each side thereof, and a length of pipe supported on said suspension member for expansion and contraction thereof during use.

3. A duct structure for pipes adapted to carry fluids at temperature extremes, said duct comprising a base structure having a concrete base slab at the bottom thereof and upstanding supporting and reinforcing frame members secured in spaced relation at each side along the length thereof, a suspension member extending across the duct from one side to the other and horizontally and rigidly tied to said supporting and reinforcing frame members and at a position medially of the top and bottom of said duct, an upper reinforcing structure bridging said reinforcing frame members at the sides of said slab, an arched monolithic superstructure encasing said reinforcing frame members at the sides and top of the duct structure, and a length of pipe supported on said suspension member for the length of said monolithic structure.

4. A duct structure for pipes adapted to carry fluids at temperature extremes, said duct comprising a base structure having a concrete base slab at the bottom thereof and outer upstanding supporting and reinforcing frame members secured in spaced relation at each side along the length thereof, inner upstanding supporting and reinforcing frame members secured in spaced relation inwardly of the outer frame members along each side for the length of said base, a suspension member horizontally and rigidly disposed with respect to said supporting and reinforcing frame members and at a position intermediate the top and bottom of said duct, an upper bridging structure connecting the upper portions of said inner frame members, concrete retaining screen material secured over said inner frame members and over the bridging structure from the base at one side thereof completely across to the other, an outer reinforcing structure bridging the outer frame members and overlying said first mentioned bridging structure, an arched monolithic superstructure encasing the outer reinforcing frame members completely around the sides and top of the duct structure, and a length of pipe supported on said suspension member for the length of said monolithic structure.

5. A duct structure for pipes adapted to carry fluid at a temperature such as to require insulation, said duct comprising a base structure having a concrete base slab at the bottom thereof and upstanding supporting and reinforcing frame members secured in transversely spaced relation therewith, a pipe suspending shaft tied rigidly at its ends to said transversely spaced supporting and reinforcing members intermediate the upper and lower ends thereof, form means secured inwardly of each of the spaced supporting and reinforcing members and bridged continuously over and across the space therebetween, a monolithic concrete arched member overlying the form means and encasing the supporting and reinforcing members, and a length of pipe logitudinally disposed within said arched member and freely supported on said shaft for expansion and contraction thereon during use.

6. The structure set forth in claim 5, wherein end portions of the shaft are tied respectively in welded joints to said transversely spaced supporting and reinforcing members.

7. The structure set forth in claim 5, wherein the form means constitutes stiff wire mesh material.

8. The structure set forth in claim 5, wherein reinforcing rods are rigidly tied across the upper ends of said transversely spaced supporting and reinforcing members and are encased together therewith in said monolithic concrete arched member.

References Cited in the file of this patent

UNITED STATES PATENTS

| Number | Name | Date |
|---|---|---|
| 384,860 | Meehan | June 19, 1888 |
| 1,744,102 | Burke | Jan. 21, 1930 |
| 1,834,549 | Randall | Dec. 1, 1931 |
| 1,861,436 | Collins | June 7, 1932 |
| 1,910,594 | De La Mare | May 23, 1933 |
| 1,987,517 | Porter et al. | Jan. 8, 1935 |
| 2,041,243 | Gottwald | May 14, 1936 |
| 2,081,867 | Gysling | May 25, 1937 |
| 2,355,966 | Goff | Aug. 15, 1944 |
| 2,483,050 | Hinchon | Sept. 27, 1949 |